(12) United States Patent
O'Neil et al.

(10) Patent No.: US 10,782,938 B2
(45) Date of Patent: Sep. 22, 2020

(54) MULTIPLE INTERFACE LED DRIVER PROGRAMMER

(71) Applicant: EPTRONICS, INC., Gardena, CA (US)

(72) Inventors: Tom O'Neil, Gardena, CA (US); Lee Chiang, Gardena, CA (US)

(73) Assignee: EPtronics, Inc., Gardena, CA (US)

( * ) Notice: Subject to any disclaimer, the term of this patent is extended or adjusted under 35 U.S.C. 154(b) by 568 days.

(21) Appl. No.: 15/807,128

(22) Filed: Nov. 8, 2017

(65) Prior Publication Data

US 2019/0138281 A1    May 9, 2019

(51) Int. Cl.
| | | |
|---|---|---|
| H01J 1/60 | (2006.01) | |
| H01J 7/42 | (2006.01) | |
| H05B 37/04 | (2006.01) | |
| G06F 8/34 | (2018.01) | |
| G06F 1/26 | (2006.01) | |
| H05B 45/00 | (2020.01) | |

(52) U.S. Cl.
CPC ............... *G06F 8/34* (2013.01); *G06F 1/266* (2013.01); *H05B 45/00* (2020.01)

(58) Field of Classification Search
None
See application file for complete search history.

(56) References Cited

U.S. PATENT DOCUMENTS

| 10,356,873 | B1* | 7/2019 | Mays, II | H05B 45/10 |
| 2014/0265919 | A1* | 9/2014 | Pope | H05B 47/18 |
| | | | | 315/294 |
| 2014/0300294 | A1* | 10/2014 | Zampini, II | H05B 45/00 |
| | | | | 315/297 |
| 2017/0086272 | A1* | 3/2017 | O'Neil | H05B 47/105 |

* cited by examiner

*Primary Examiner* — Anh Q Tran
(74) *Attorney, Agent, or Firm* — Clement Cheng

(57) ABSTRACT

An I2C and Manchester multiple serial interface LED driver programmer has a programmer that changes the operation parameters in the EEPROM of the LED driver via a computer graphic user interface. The LED driver operation is thus programmed according to the parameters stored in the EEPROM. The multiple interfaces are selectable as USB-to-I2C, RS232-to-I2C, USB-to-TxD/RxD, RS232-to-TxD/RxD and 3rd via a pass through USB-to-USB port for expanded LED programming interface such as Near Field Communication. The I2C and Manchester multiple serial interface LED driver has multiple output interface with USB-to-I2C, RS232-to-I2C, USB-to-TxD/RxD, RS232-to-TxD/RxD and third pass through USB-to-USB port for Near Field Communication interface.

8 Claims, 2 Drawing Sheets

LED Programmer Block Diagram

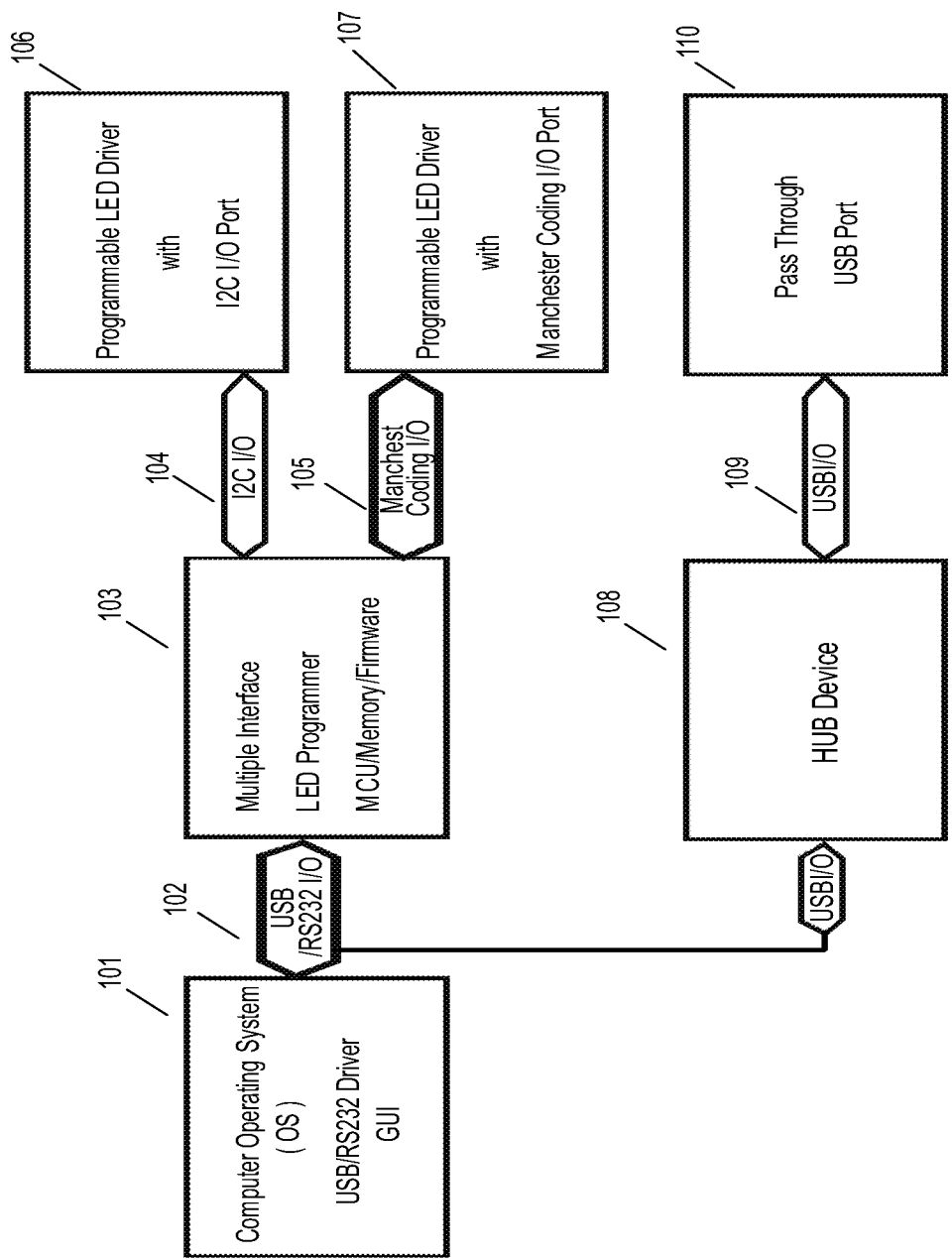
Fig. 1 LED Driver Programming Setup

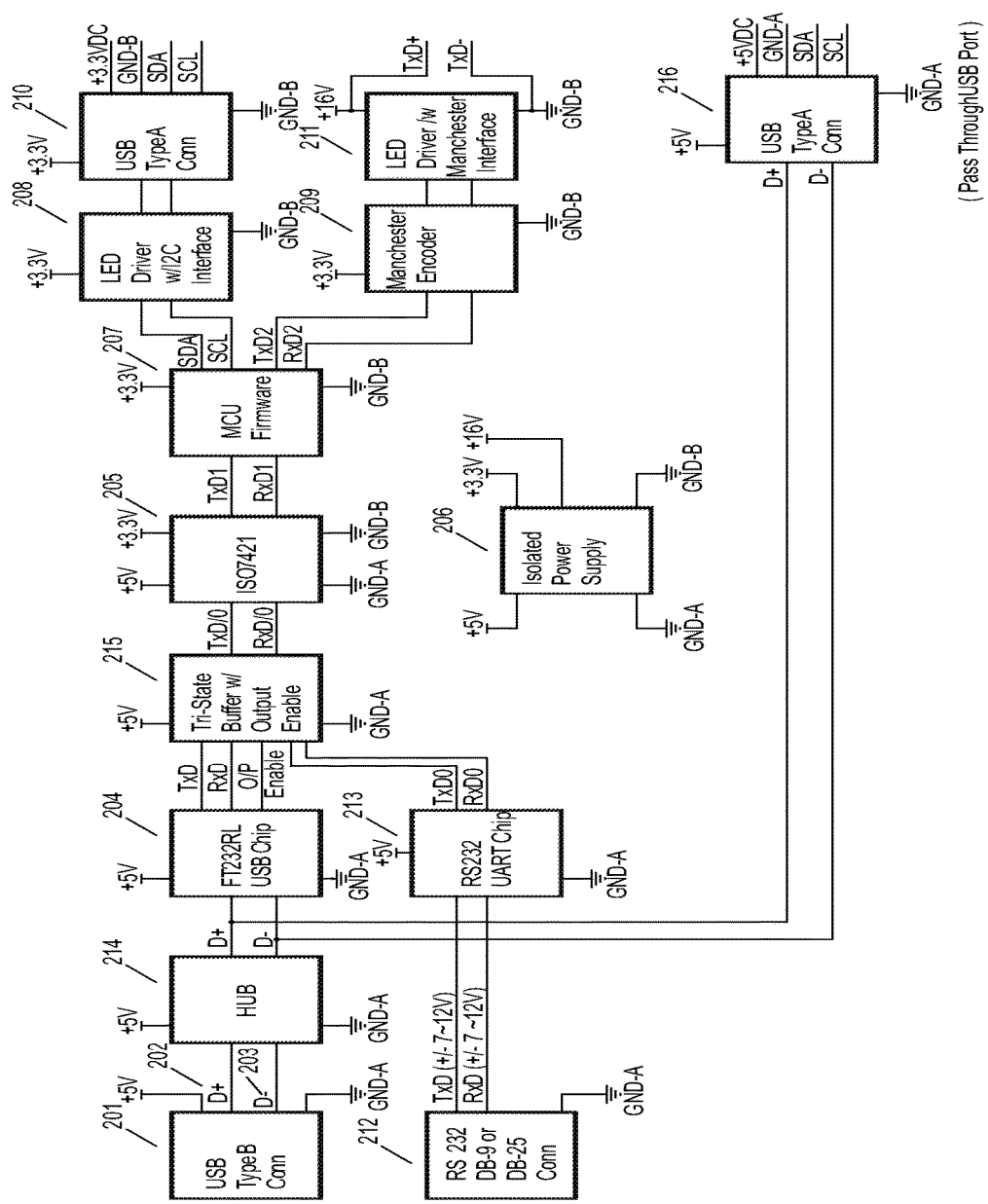
Fig. 2 LED Programmer Block Diagram

MULTIPLE INTERFACE LED DRIVER PROGRAMMER

FIELD OF THE INVENTION

The present invention is in the field of LED programmers.

DISCUSSION OF RELATED ART

A variety of different programmable LED drivers have been described in the patent literature and in the prior art. For example, inventor O'Neil has an I2C interface for LED driver parameters programming in his invention described in U.S. Pat. No. 9,544,951, entitled Programmable LED Driver and published Jan. 10, 2017. Inventor Harish Gopala Pillai, in U.S. patent 2015/0094827, entitled Apparatus and Methods for External Programming of Processor of LED Driver and published Apr. 2, 2015, describes a disclosure with a programming mode and 2 control inputs. In U.S. patent 2016/0165702, entitled Programmable Lighting Device and Method and System for Programming Lighting Device and published Jun. 9, 2016, inventor Lai describes a programmable lighting device wherein a driver is configured to generate a supply voltage. Inventor Yao discusses an LED Driver including an amplifier configured to receive a negative voltage input signal and produce a positive voltage output signal in response thereto in his invention described in U.S. Pat. No. 9,131,578, entitled Programmable Light Emitting Diode (LED) Driver Technique Based Upon an Input Voltage Signal and published Sep. 8, 2015. Inventor Williams discloses an LED driver for driving external strings of LEDs in U.S. Pat. No. 9,351,364, entitled Low Cost LED Driver with Improved Serial Bus and published May 24, 2016.

In U.S. Pat. No. 9,078,310, entitled Configurable LED Driver/Dimmer for Solid State Lighting Applications and published Jul. 7, 2015, inventor Tikkanen discusses a LED driver for powering a set of light fixture loads. Inventor Siessegger discusses a LED driver utilizing a controller manipulating dimming signals in U.S. Pat. No. 9,374,015 entitled Lighting Driver Having Multiple Dimming Interfaces and published Jun. 21, 2016. In U.S. patent 2014/0368127, entitled Field Configurable LED Drivers for Lighting and published Dec. 18, 2014, inventor Hollander discusses a system for remotely configuring LED drivers.

SUMMARY OF THE INVENTION

A multiple interface LED driver programmer has at least three communication interfaces including a first communication interface being a USB or RS232 serial input, a second communication interface being I2C and Manchester serial output communication interfaces and a third communication interface being a pass through USB port via a HUB device. The multiple interface LED programmer programs specific programmable LED drivers' operation parameters via a computer Graphic User Interface (GUI) program. The programmable LED driver's operation parameters can be changed, such as output LED current maximum and minimum values, dimming control curves, over temperature protection, and the like. A standard USB "type A to type B" or RS232 or equivalent cable is connected from the computer to the input of the multiple interface LED programmer. One of the outputs "USB Type A to USB mini" cable is connected to a programmable LED driver with I2C interface. This LED driver programmer will convert the USB data into I2C data format for the LED Drivers to be programmed. Another output 2-pin connector with 2 wires is also connected to a programmable LED driver with a Manchester serial communication interface. This LED driver programmer will also convert the USB data into Manchester serial data format for the LED driver to be programmed. A third interface is a pass through USB port that can be used in conjunction with any standard USB device or a LED driver programming device, such as a Near Field Communication (NFC) LED programming protocol.

In U.S. Pat. No. 9,544,951 Programmable LED Driver by original assignee EPtronics Inc., the programmable LED driver operates in conjunction with a USB/I2C input digital interface to accept commands and data from a local computer with Graphic User Interface (GUI) software program to read/modify/write the programmable LED driver's operation parameters. This USB/I2C is a Universal Serial Bus (USB) with specific—Operating System USB driver installed for this GUI. It is necessary for another Electronics device to convert the USB commands and data into the industrial standard "Inter-Integrated Circuit" (I-squared-C, or $I^2C$ or I2C for short) signal format. The present invention is the Electronics LED driver programming device, which can be used in conjunction with the device described in U.S. Pat. No. 9,544,951 Programmable LED Driver granted to EPtronics Inc.

The Operating System has a detailed graphical representation on the screen. It has adapted the USB serial interface for a long time. However, all USB devices require a specific operating system device driver to be installed before the system can recognize the new USB device and then communicate with it. Typical USB cable hardware contains 4 wires: +5 VDC, ground, +Data and −Data.

USB is a very high speed serial data transmission protocol at typical 480 Mbits/s (480 mega bits per second, or 60 mega bytes per second). At this high speed communication rate, the USB device needs another processor or microcontroller unit (MCU) to translate and convert the signals into electronic or MCU user-friendly signals. Therefore, there are some popular USB signal processor chips available on the market, usually a MCU with built-in specific functions for USB communication.

A very common operation for the USB chip is to convert the USB signals into I2C serial communication in bi-directional read and write format. The I2C interface has typical 4 wires, Serial Data SDA, Serial Clock SCL, +5 VDC power source Vcc and GND. The complex USB signals are converted into SDA and SCL I2C signal format and then any MCU with developed firmware can read the original USB signal easily via input port. When the SCL signal is logic high level (or 5 VDC for positive logic system), then read the SDA voltage level will also be high (5 VDC being logic 1 for positive logic system).

The background of the present invention is based on the GUI software USB conversion into Electronics or MCU user-friendly features. Although possible to have built-in Electronics, with MCU and firmware, to convert the USB into I2C for each programmable LED Driver, it adds too much per unit cost on the programmable LED drivers. It is necessary to develop a standalone USB to I2C interface electronics, which contains the USB input cable, an electronic printed circuit board with protective housing and I2C output cable.

The present invention is an implementation of this USB-to-I2C device as an accessory to the programmable LED drivers. The end users only need at least 1 such USB-to-I2C device to exercise the programmable functions, without paying too much cost for a built-in USB-to-I2C design in every single programmable LED driver.

There is another type of industrial standard bi-directional serial bus communication called Manchester Coding. It is based on a differential voltage levels to avoid communication errors and easy to synchronize the communication.

The present invention has already deciphered the USB signals for I2C operation. It is another feature to use the same deciphered USB signal and produce the second output interface using Manchester Coding which only requires 2 connections, signal (which includes Vcc power) and ground. The present invention is a multiple interface LED driver programming interface.

The USB input data is first converted into Universal Asynchronous Receiver Transmitter (UART) signals in 5V logic. The USB input can also be changed to use an RS232 input as an alternative standard 7~12V/−7~−12V RS232 which can then also be converted into UART signals in 5V logic and then uses the same conversion circuitry.

There is a HUB device built-in the multiple interface LED programmer, which splits the input USB port into at least 2 output ports. One USB output port is used in the USB to I2C converter and USB to USART converter circuitry, which leaves another free USB port to replace the 1 USB port being consumed from the input device. The computer Operating System will find the HUB device and automatically assign 2 new USB ports for usage. This extra expanded USB port can be used for any third output interface for any standard USB device or a LED programming device, such as a Near Field Communication (NFC) LED programming.

SUMMARY OF THE CLAIMS: An I2C and Manchester multiple serial interface LED driver has a programmer that changes the operation parameters in the EEPROM of the LED driver via a computer graphic user interface. The LED driver operation is thus programmed according to the parameters stored in the EEPROM. The multiple interfaces are selectable as USB-to-I2C, RS232-to-I2C, USB-to-TxD/RxD, RS232-to-TxD/RxD and 3rd via a pass through USB-to-USB port for expanded LED programming interface such as Near Field Communication.

The I2C and Manchester multiple serial interface LED driver has multiple output interface with USB-to-I2C, RS232-to-I2C, USB-to-TxD/RxD, RS232-to-TxD/RxD and third pass through USB-to-USB port for Near Field Communication interface. It can save cost and storage space for 2 separate USB-I2C and RS232 LED driver programmers. The pass through USB port can be used for the third output interface for any standard USB device or a LED programming device, such as a Near Field Communication (NFC) LED programming.

The I2C and Manchester multiple serial interface LED driver programmer USB digital signals are isolated and coupled to the output for the LED driver. It has a built-in isolated power supply which is fully isolated from the LED driver programmer to the LED driver; therefore there is no electrical shock risk for the operators during programming process. The I2C and Manchester multiple serial interface LED driver has a built-in isolated switching power supply which is powered up by the computer USB port via the USB cable. No additional power source is required during the programming process.

The I2C and Manchester multiple serial interface LED driver uses a Graphic User Interface software that provides a unique visual effect for the parameters to be programmed. This software can record and save newly programmed parameters data into data base for manufacturing record.

The I2C and Manchester multiple serial interface LED driver of has a built-in isolated switching power supply to power up the EEPROM in the LED driver where the LED driver operation parameters are stored. The LED driver don't have to be powered up by AC while programming.

The input interface from the computer can have multiple operations. Standard is USB with corresponding Graphic User Interface software to address the USB port data. An alternate interface from the computer can be standard RS232 with same Graphic User Interface software to address the RS232 port data. The third is a pass through USB port that can be used as a standard USB device or a LED programming device, such as a Near Field Communication (NFC) LED programming.

The USB-to-I2C, RS232-to-I2C, USB-to-TxD/RxD, RS232-to-TxD/RxD multiple interface can be switched automatically. By applying the USB chip built-in, USB activity acknowledgment PWREN # or SLEEP # signals the Tri-State Buffer with either an active high or active low output enable control signal.

BRIEF DESCRIPTION OF THE DRAWINGS

FIG. 1 is a system diagram of the programmable LED driver.

FIG. 2 is a block diagram of the present invention, a multiple interface LED driver programmer.

The following call out list of elements can be a useful guide in referencing the elements of the drawings.
101 computer operating system
106 Programmable LED Driver with I2C I/O Port
107 Programmable LED Driver with Manchester Coding I/O Port
103 LED Driver Programmer
102 USB or RS232 input/output (I/O) cable
108 HUB Device
110 Pass Through USB Port
109 USB I/O signal pair
104 I2C I/O cable
105 simple "twisted pair" wires
205 isolation chip ISO7241
201 USB Type B connector
204 USB interface chip FT232RL
214 HUB device
202 USB data D+
203 USB data D−
216 USB Type A pass through port
212 DB-25 connector DB-9 or DB-25
213 RS232 UART chip
207 MCU with Firmware
208 I2C interface circuitry
209 Manchester Encoder
211 Manchester interface circuitry
215 Tri-State Buffer device
210 USB Type A connector
206 Isolated Power Supply

DETAILED DESCRIPTION OF THE PREFERRED EMBODIMENT

The detailed description begins with a glossary for clarifying terminology as well as assisting a layperson in understanding the disclosure.

Glossary

Operating System is the software that supports a computer's basic functions, such as scheduling tasks, executing applications, and controlling peripherals.

LED short for Light Emitting Diode, is a two-lead semiconductor light source.

LED Driver is an electrical device that regulates the power to an LED or a string of LEDs. An LED driver responds to the changing needs of the LED, or LED circuit, by providing a constant quantity of power to the LED as its electrical properties change with temperature.

USB short for Universal Serial Bus, is an industry standard that defines cables, connectors and communications protocols for connection, communication, and power supply between computers and devices.

USB Type A are receptacles that can be found on upstream devices such as a USB host or a hub. Type A plugs can be found on cables and smaller peripherals such as a mouse or flash drive.

USB Type B Typically, the Type-B connector is the other end of a standard USB cable that plugs into peripheral devices (such as a printer, a phone or an external hard drive).

Manchester Coding also known as phase encoding or PE, it is a a line code in which the encoding of each data bit is either low then high, or high then low, of equal time in telecommunication and data storage, HUB Device A hub, also called a network hub, is a common connection point for devices in a network. Hubs are devices commonly used to connect segments of a LAN. The hub contains multiple ports. When a packet arrives at one port, it is copied to the other ports so that all segments of the LAN can see all packets. The HUB device here can split the input USB port into 2 or more expanded USB ports. 1 expanded USB port is used for the LED programmer, and at least 1 expanded USB port is used for the pass through USB port.

GUI short for graphical user interface, is a type of user interface that allows users to interact with electronic devices through graphical icons and visual indicators such as secondary notation, instead of text-based user interfaces, typed command labels or text navigation.

USB I/O The bus-powered USB-1024LS from Measurement Computing adds 24 channels of logic-level digital I/O to any USB port. It's the perfect tool for monitoring and controlling the state of switches, fans, valves—any simple electrical device on the bench or on the factory floor.

MCU sometimes referred to as an embedded controller or microcontroller unit (MCU), are devices or computers on a single integrated circuit.

Tri-state Buffer Device are devices that allow an output port to assume a high impedance state in addition to the 1 and 0 logic levels, effectively removing the output from the circuit.

Isolation Chip is a device that transports data and power between a high voltage and a low voltage circuit while preventing hazardous DC or uncontrolled transient current from flowing in between the two.

Isolation chip ISO7241 Used in conjunction with isolated power supplies, these devices block high voltage, isolate grounds, and prevent noise currents from entering the local ground and interfering with or damaging sensitive circuitry.

I2C Interface is a serial computer bus typically used for attaching lower-speed peripheral Ics to processors and microcontrollers in short-distance, intra-board communication.

RS-232 In telecommunications, RS-232 is a standard for serial communication transmission of data. It formally defines the signals connecting between a data terminal equipment such as a computer terminal and a data circuit-terminating equipment such as a modem.

Universal Asynchronous Receiver Transmitter (UART) is a computer hardware device for asynchronous serial communication in which the data format and transmission speeds are configurable. A UART is usually an individual (or part of an) integrated circuit used for serial communications over a computer or peripheral device serial port. UARTs are now more commonly included in microcontrollers.

Universal Synchronous and Asynchronous Receiver-Transmitter (USART) is a type of serial interface device that can be programmed to communicate asynchronously or synchronously.

Serial Data is data that consists of bits sent singly one after another along the same route, rather than groups of 8,16, etc., bits at a time. Serial communication is the process of sending data one bit at a time over a communication channel or computer bus.

GND (Ground) In electronics and electrical engineering, ground is defined as the reference point in a circuit and carries a voltage of 0V.

Simple "Twisted Pair" Wiring is a type of wiring in which two conductors of a single circuit are twisted together for the purpose of canceling out electromagnetic interference from external sources.

Near Field Communication (NFC) is a short-range wireless connectivity standard that uses magnetic field induction to enable communication between devices when they're touched together, or brought within a few centimeters of each other.

FT232R USB is a USB to serial UART interface semiconductor chip

DB-9 or DB-25 is a 9-pin or 25-pin electrical connector for serial and parallel computer ports. D-sub connectors are a family of plugs and sockets widely used in communication s and in earlier PCs.

Megabits is a unit of data size or (when expressed per second) network speed, equal to one million, more accurately, 1,048,576 bits.

Megabyte is a unit of data size or network speed, where 1 bit is equal to 8 bytes. 1 Megabyte is equal to 8 Megabits.

Vcc An electronics designation that refers to voltage from a power supply connected to the "collector" terminal of a bipolar transistor, or the DC power source for a semiconductor chip. Double letters (cc) refer to power supply voltages.

As seen in FIG. 1, a diagram describes the system setup for the programmable LED driver which includes a computer (101) with an Operating System (OS) installed with a specific USB or RS232 device driver and a User Graphic Interface (GUI) software that can communicate with the one or two programmable LED Drivers with I2C (106) or Manchester Coding (107) interface via the present invention of the multiple interface LED Driver Programmer (103).

The USB or RS232 input/output (I/O) cable (102) is a typical USB Type A connector at the computer (101) side, and USB Type B connector at the input side of the LED Driver Programmer (103). The USB or RS232 input/output (I/O) cable (102) for RS232 style input is a typical DB-9 or DB-25 connector at the computer (101) side, and DB-9 or DB-25 connector at the input side of the LED Driver Programmer (103).

The USB or RS232 input/output (I/O) cable (102) can also split the USB I/O to a built-in HUB device (108), which can expand at least 1 more USB port through the USB I/O signals to a pass though USB Port (110) via USB I/O signal pair (109). This expanded USB port can be configured by the computer Operating System (101) for any standard USB device application or add a third interface to program LED, such as a Near Field Communication (NFC).

The I2C I/O cable (104) connecting from the output side of the LED Driver Programmer (103) is a typical USB Type A connector, and a typical USB Mini connector at the Programmable LED Driver with a I2C interface (106). The Manchester Coding cable connecting from the output side of the LED Driver Programmer (103) to the Programmable LED Driver with Manchester Coding interface (107) is a simple "twisted pair" wires (105) for typical differential signaling.

As seen in FIG. 2, the block diagram of the present invention shows a multiple interface LED driver programmer. Two isolated circuits are referenced on two different grounds, namely GND-A and GND-B. This extra ground is intended to protect the computer equipment (101) from damage if the programmable LED drivers (106 and 107) have high voltage difference between GND-A and GND-B.

The line of isolation falls at mid of the isolation chip ISO7241 (205) and Isolated Power Supply (206), which provides isolated signals TxD/0 and TxD1 pair as well as RxD/0 and RxD1 pair. This isolation chip ISO7241 (205) and Isolated Power Supply (206) have both grounds GND-A and GND-B.

The digital logic signal TxD/0 referenced to GND-A is coupled to the signal TxD1 referenced to GND-B via internal capacitor of the isolation chip ISO7241 (205). The digital logic signal RxD1 referenced to GND-B is coupled to the signal RxD/0 referenced to GND-A via another internal capacitor of the isolation chip ISO7241 (205).

The input USB Type B connector (201) and the USB interface chip FT232RL (204) are both referenced to the GND-A. The HUB device (214) is also referenced to GND-A, which splits USB data D+ (202) and D− (203) into at least 2 ports of D+ and D− signal pair. One signal pair of D+ and D− is fed to the USB interface chip FT232RL (204), and the other signal pair of D+ and D− is fed to the USB pass through port (216). This USB pass through port (216) is also referenced to GND-A, same as computer (101) as an expanded USB port to compensate the one USB port being used. This pass through USB port (216) can be used by any standard USB device, or a LED programming device, such as a Near Field Communication (NFC) LED programming. With a properly developed GUI, this NFC LED programming can be configured as the third interface for the present invention of multiple interface LED programmer.

The input RS232 DB-9 or DB-25 connector (212) and RS232 UART chip (213) (commercial available such as MAXIM™ part number MAX232) are both referenced to the GND-A. The output side of MCU (207), I2C interface (208), Manchester Encoder (209), USB Type A Connector (210) and Manchester Interface (211) are all referenced to GND-B.

The Isolated Power Supply (206) is an isolated switching mode power supply. The input power is supplied by the +5 VDC from USB Type B connector (201), which is referenced to GND-A. There are 2 outputs of the Isolated Power Supply (206). The first output +3.3 VDC is reference to GND-B, it is the power source for the MCU (207), I2C interface (208), Manchester Encoder (209). The second output +16 VDC is also referenced to GND-B, it is the power source for the Manchester interface circuitry (211). In the application of RS232 input style, the RS232 UART chip (213) +5V power source is also supplied by the +5 VDC from USB Type B connector (201). The RS232 UART chip (213) converts the standard RS232 signals +/−7~12V voltages TxD (+/−7~12V) and RxD (+/−7~12V) into 5V logic signals TxD0 and RxD0. Therefore, in the application of RS232 input style, the USB Type B connector (201) cable is used solely for the +5V power source for the RS232 UART chip (213) and the USB data is not in use.

In the application of USB input style, the USB signal pair D+ and D− are converted into 5V logic signals TxD and RxD by FT232RL USB Chip (204). In the application of RS232 input style, the RS232 signal pair TxD(+/−7~12V) and RxD(+/−7~12V) are converted into 5V logic signals TxD0 and RxD0 by RS232 UART Chip (213). Both pairs of output signals (TxD and RxD pair and TxD0 and RxD0 pair) are to be processed the same way for the rest of the circuitry. However, only 1 input interface will be enabled at one time. The FT232RL USB Chip has a built-in "SLEEP #" sleep output signal, which will output a signal at logic low level (near 0V) when the USB port has no activity in suspend mode. This "SLEEP #" can be used as the "Output Enable" active low signal (O/P Enable) for the Tri-State Buffer device (215) to select the RS232 or USB input style automatically. However, if the Tri-State Buffer device (215) has "active high" output enable signal, then the FT232RL USB Chip has another built-in "PWREN #" power-enable output signal, which will output a signal at logic high level (above 2.4V) when there USB port has no activity in suspend mode. In this case the PWREN # signal can also used to select the RS232 or USB input style automatically. "SLEEP #" logic low level will disable USB and enable RS232, and "SLEEP #" logic high level will enable USB and disable RS232.

The Tri-State Buffer (215) output signal TxD/0 is selected automatically from the FT232RL USB Chip (204) output signal TxD, or from the RS232 UART Chip (213) output signal TxD0, depending on the USB activity is suspended or not. The Tri-State Buffer (215) input signal RxD/0 is automatically output to the FT232RL USB Chip (204) input signal RxD, or output to the RS232 UART Chip (213) input signal RxD0, depending on the USB activity is suspended or not.

The I2C output uses a USB Type A connector (210) which carries +3.3 VDC power source referenced to GND-B, and SDA and SCL signals. This +3.3 VDC will provide the necessary +3.3 VDC power source for the Programmable LED Driver during programming. The LED Driver EEPROM section where the operation parameters are stored is powered up by this +3.3 VDC power source, while the rest Electronics of the Programmable LED Driver are isolated by an internal isolation diode on the Programmable LED Driver and not to be powered up during this programming process. Therefore, the AC power source for the Programmable LED Driver is not required while programming.

The Manchester Encoder (209) uses the +3.3 VDC power and referenced to GND-B from the Isolated Power Supply (206). The MCU (207) communicates the Manchester Encoder (209) with TxD2 and RxD2 signals. These 2 signals are encoded and decoded then connected to the Manchester output interface (211). The Manchester output interface (211) is a differential signal pair wires TxD+ and TxD−. These 2 signals are modulated digital signals. TxD+ signal is superimposed on top of the +16 VDC line, and the TxD− signal is superimposed on the GND-B line. This +16 VDC will provide the necessary +16 VDC power source for the Programmable LED Driver during programming. The LED Driver EEPROM section, where the operation parameters are stored, is powered up by an internal +3.3 VDC power source regulated from the +16 VDC, while the rest Electronics of the Programmable LED Driver are isolated by an internal isolation diode and it is not to be powered up during this programming process. Therefore, the AC power source for the Programmable LED Driver is not required while programming.

The invention claimed is:

1. An I2C and Manchester multiple serial interface LED driver programmer comprising:
   a. a programmer that changes operation parameters in an EEPROM of a programmable LED driver via a graphical user interface on a computer; LED driver operation programmed according to parameters stored in the EEPROM, wherein the programmer connects to the EEPROM via a first selectable interface and a second selectable interface, wherein the first selectable interface and the second selectable interface are chosen from the group of: USB-to-I2C, RS232-to-I2C, USB-to-TxD/RxD, RS232-to-TxD/RxD, and wherein a third interface is a pass through USB-to-USB port for an expanded LED programming interface which includes Near Field Communication.

2. The I2C and Manchester multiple serial interface LED driver programmer of claim 1, wherein a multiple output interface includes the interfaces of: USB-to-I2C, RS232-to-I2C, USB-to-TxD/RxD, RS232-to-TxD/RxD, wherein the multiple output interface includes a third interface which is a pass through USB-to-USB port for Near Field Communication, whereby a single driver programmer replaces separate USB-I2C and RS232 LED driver programmers, wherein the pass through USB-to-USB port provides a third output interface for any standard USB device or an LED programming device, which includes a Near Field Communication (NFC) LED programming.

3. The I2C and Manchester multiple serial interface LED driver programmer of claim of 1, wherein the LED driver programmer USB digital signals are isolated and coupled to the output for the LED driver with built-in isolated power supply which is fully isolated from the LED driver programmer to the LED driver, thereby eliminating operator electrical shock risk during programming.

4. The I2C and Manchester multiple serial interface LED driver programmer of claim 3, further comprising a built-in isolated switching power supply that is configured to receive power from the computer USB port via a USB cable, wherein no additional power source is required during the programming process.

5. The I2C and Manchester multiple serial interface LED driver programmer of claim 1, wherein the graphical user interface software provides a unique visual effect for the parameters to be programmed, and wherein the graphical user interface software can record and save newly programmed parameters data into a database for maintaining a manufacturing record.

6. The I2C and Manchester multiple serial interface LED driver programmer of claim 4, wherein the built-in isolated switching power supply powers the EEPROM in the LED driver where the LED driver operation parameters are stored, wherein the LED driver does not need to be powered up by AC during programming.

7. The I2C and Manchester multiple serial interface LED driver programmer of claim 1, wherein the input interface from the computer provides multiple operational modes including: a standard mode using USB with a corresponding graphical user interface to address a USB port data; a second mode providing an alternate interface from the computer that is standard RS232 with the graphical user interface to address RS232 port data; or third mode which is the pass through USB port that allows connection with any standard USB device or a LED programming device, including a Near Field Communication (NFC) LED programmer.

8. The I2C and Manchester multiple serial interface LED driver programmer of claim 1, wherein the USB-to-I2C, RS232-to-I2C, USB-to-TxD/RxD, RS232-to-TxD/RxD multiple interface are switched automatically applying the USB chip built-in USB activity acknowledgement PWREN # or SLEEP # signals to the Tri-State Buffer with either active high or active low output enable control signal.

* * * * *